United States Patent [19]
Collignon

[11] 4,445,753
[45] May 1, 1984

[54] END FITTING FOR OPTICAL FIBRE CONNECTOR AND CONNECTOR EQUIPPED WITH SUCH AN END FITTING

[75] Inventor: Roger Collignon, Suresnes, France

[73] Assignee: Socapex, Suresnes, France

[21] Appl. No.: 315,268

[22] Filed: Oct. 26, 1981

[30] Foreign Application Priority Data

Oct. 31, 1980 [FR] France ............................. 80 23391

[51] Int. Cl.³ .............................................. G02B 7/26
[52] U.S. Cl. .............................. 350/96.21; 350/96.20
[58] Field of Search ................. 350/96.20, 96.21, 96.22

[56] References Cited

U.S. PATENT DOCUMENTS

| 4,124,272 | 11/1978 | Henderson et al. | 350/96.21 |
| 4,193,664 | 3/1980 | Ellwood | 350/96.21 |
| 4,198,122 | 4/1980 | Prunier et al. | 350/96.21 |
| 4,205,898 | 6/1980 | Matthews et al. | 350/96.21 |
| 4,303,301 | 12/1981 | Teichert et al. | 350/96.22 X |

FOREIGN PATENT DOCUMENTS

| 2379079 | 8/1978 | France . |
| 2408152 | 6/1979 | France . |
| 52-49039 | 4/1977 | Japan | 350/96.20 |

Primary Examiner—John D. Lee
Attorney, Agent, or Firm—Cushman, Darby & Cushman

[57] ABSTRACT

The invention relates to connectors for optical transmission lines. It more specifically relates to an end fitting for an optical fibre connector, comprising at least one substantially cylindrical locating sleeve in which an optical monofibre is fixed. According to the invention the locating sleeve is provided with orientation means in the form of a ball joint permitting the sleeve to pivot within the end fitting. Preferably the ball joint comprises an elastic O-ring ensuring the sealing of the optical cable.

15 Claims, 2 Drawing Figures

FIG_1
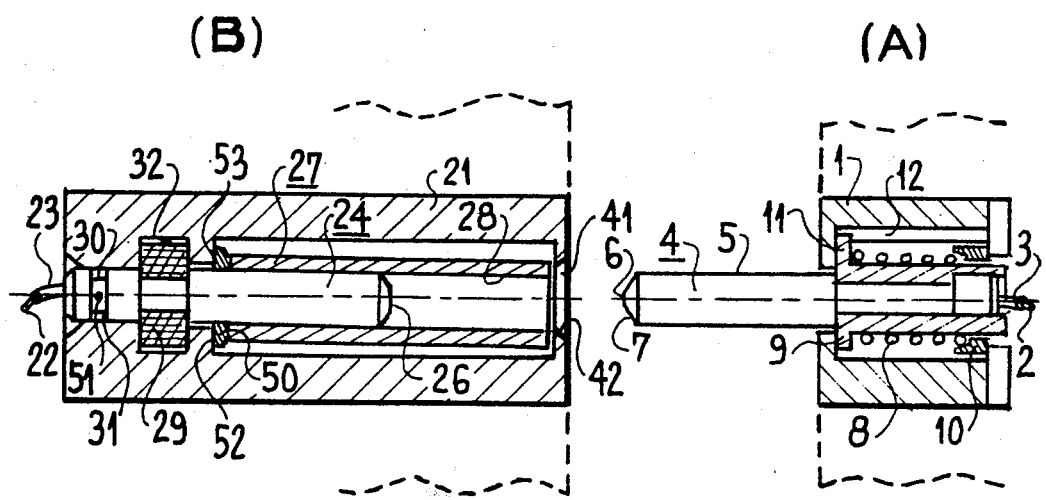
FIG_2
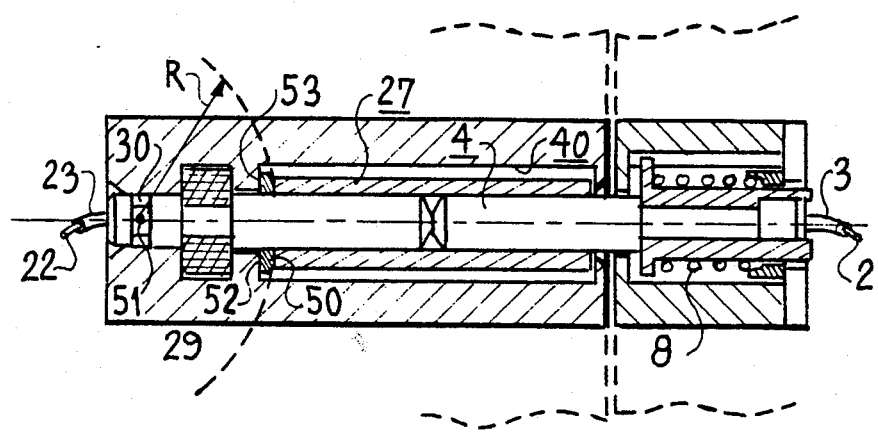

END FITTING FOR OPTICAL FIBRE CONNECTOR AND CONNECTOR EQUIPPED WITH SUCH AN END FITTING

BACKGROUND OF THE INVENTION

The present invention relates to an end fitting or termination for an optical fibre connector, comprising at least one substantially cylindrical locating sleeve in which is fixed an optical fibre. At the front end of the locating sleeve there is a contact free at which issues the fibre and in the vicinity of its opposite end there are means for positioning the sleeve in the end fitting, as well as means for orienting the sleeve.

It also relates to connectors equipped with such an end fitting or termination.

An end fitting of this type is described, for example, in U.S. Pat. No. 4,193,664. The latter has a substantially cylindrical shape with two faces cut in V-like manner bearing on complementary surfaces in the female part of the connector. In order to adjust the alignment of the two optical fibres to be connected, said end fitting also has screws for the location of the fibre, permitting an alignment thereof.

The connectors of optical fibres produced with such end fittings have a certain number of disadvantages. The corresponding end fittings must be very accurately machined, which necessarily increases the production costs. Moreover, after connecting the male and female end fittings it is necessary to align the fibres by means of corresponding screws in order to obtain a minimum attenuation of the data transmitted by the connector. This operation is necessarily long and complicated. Finally such end fittings cannot be used for the simultaneous connection of a plurality of optical channels. Thus, the very small adjustment tolerances necessary for the connection of two end fittings are further reduced when a plurality of end fittings are to be simultaneously fitted and it is not possible at present to manufacture multi-channel optical fibre connectors using said end fittings and having acceptable performance levels.

BRIEF SUMMARY OF THE INVENTION

The end fittings for optical fibre connectors according to the invention obviate these disadvantages. They are characterized in that the orientation means of the locating sleeve are constituted by a ball joint positioned between the locating sleeve positioning means and the back end of the end fitting, said ball joint making it possible to pivot the sleeve within the end fitting.

Preferably the said ball joint is constituted by a groove cooperating with an O-ring located therein and bearing on the corresponding inner recess of the end fitting.

With such an end fitting it is not necessary to use adjusting screws after the connection thereof in the corresponding female end fitting. A self-alignment of the optical fibres to be connected is obtained by pivoting about the ball joint.

In addition, such an end fitting has the advantage of being tightly sealed when the O-ring used is elastic, making it possible to use said end fitting for the connection of optical fibres in a liquid medium. There is no danger of the liquid rising in the sheath of the optical cable.

In order to ensure an adequate clearance to permit connection, but which must not be too large, particularly in the case of multi-channel connectors, the positioning means located between the ball joint and the front end of the end fitting are constituted by a disk provided with a central groove, whose two inner and outer base surfaces respectively cooperate with shoulders carried by the end fitting of the connector and the locating sleeve located therein, said disk being fixed with a transverse clearance in the end fitting, while ensuring locking in translation.

In practice it has been found that these positioning means must have dimensions such that the pivoting of the locating sleeve about the ball joint is within a cone having an apex angle of approximately 1°.

To ensure the connection of an end fitting according to the invention to another optical fibre end fitting having a locating sleeve of the same shape as that of the end fitting according to the invention, preference is given to the use of a coupling sleeve like that described in French Patent Application No. 80 06 613 in the name of the applicant company.

If it is desired that the end fitting according to the invention is in the form of a female and fitting, it is merely necessary to provide the locating sleeve with a coupling sleeve, like that to which reference was made hereinbefore. Preferably the coupling sleeve is held in the end fitting by joined parts fixed to the latter, thus preventing the disengagement of the said sleeves.

BRIEF DESCRIPTION OF THE DRAWINGS

The invention is described in greater detail hereinafter relative to non-limitative embodiments and the attached drawings, wherein show:

FIG. 1—a sectional view of a connector using and end fitting according to the invention, said connector having two portions A and B shown in disconnected form.

FIG. 2—the connector of FIG. 1 in the connected position.

DETAILED DESCRIPTION OF THE PREFERRED EMBODIMENTS

In portion A of the connector of FIG. 1 a fibre 2 provided with its protecting tube 3 is located in the cylindrical locating sleeve 4, which has a longitudinal axial groove where it is fixed after baring by a per se known means such as a polymerizable glue. This fixing operation can advantageously be carried out in the workshop on a mounting device ensuring the concentricity between fibre 2 and the outer cylindrical surface 5 of locating sleeve 4 during polymerization.

The contact face 6 of the fibre, surrounded by a cone of revolution-shaped chamfer 7, issues into the front part of the locating sleeve. The complete sleeve can move longitudinally in the end fitting of the connector 1 which supports it. A spring 8 located between a flange 9 integral therewith and a ring 10 integral with the end fitting, places sleeve 4 in the advanced position. Finally a lug 11, integral with the sleeve, cooperating with a slot 12 integral with the end fitting, positively fixes the angular orientation of the sleeve therein. The opening of connector 1 through which the locating sleeve passes has a slightly larger diameter than the latter. This provides a lateral clearance for the sleeve during coupling (vertical displacement in the drawing).

Portion (A) described hereinbefore thus has the property of permitting both a longitudinal and lateral displacement of the locating sleeve, which in particular makes it possible in the case of simultaneous multichannel coupling to prevent stresses between the locating and coupling sleeves, thereby ensuring a good alignment of the fibres.

Portion (B), which for simplification reasons can be called the female part, represents an end fitting according to the invention. A monofibre 22, provided with its protecting tube 23 is located and fixed under the same conditions as for portion (A) in the cylindrical locating sleeve 24.

The contact face 26 of the fibre issues into the front part of locating sleeve 24. The bringing of face 26 into a facing position with respect to face 6 of the fibre of portion (A) ensures the optical transmission after connection.

Locating sleeve 24 carries a coupling sleeve 27 in the form of a tube, whereof the internal diameter of the free projecting part 28 is made slightly smaller than the external diameter of sleeve 4.

A typical constructional embodiment of this coupling sleeve comprises, while adopting the same external diameter for the two locating sleeves 4 and 24 of portions (A) and (B), making it from a tube of elastic material provided with a longitudinal slot and exerting a tightening action on the sleeves when they have been introduced.

The locating sleeve 24 is fixed in end fitting 21 by a disk-like means 29, the sleeve being longitudinally held there by shoulders bearing on the lateral faces of said disks and respectively carried by the sleeve and the end fitting.

Moreover, a gasket constituted by a toroidal elastic ring 30 is placed at the opposite end with respect to the intake face of the end fitting in a groove 31 carried by the locating sleeve.

According to the invention, in addition to its function as an angular pivoting centre for locating sleeve 24, said elastic ring also has a sealing function.

Thus, if the position of locating sleeve 24 is well defined longitudinally by disk 29, it is indispensable for the sleeve, as well as its coupling sleeve 27, to have a transverse mobility relative to end fitting 21, in the same way as the necessity was indicated hereinbefore for multichannel connectors, in order to compensate the inevitable position differences of each of these during connection.

To this end the invention makes it possible for the pivoting of locating sleeve 24 about its centre 51 located substantially in the median plane of the O-ring by providing a "clearance" 32 between the respectively outer and inner lateral cylindrical surfaces of disk 29 and its recess in the end fitting. To give an idea of the order of magnitude the selected pivoting can be ±1° relative to the axis.

FIG. 2 shows the two portions (A) and (B) in the connected position. Connection is brought about by moving together portions (A) and (B), locating sleeve 4 having entered with gentle friction the elastic coupling sleeve 27 carried by the locating sleeve 24. Simultaneously contacting takes place between the respective optical transmission faces 6 and 26 of the male locating sleeve 4 and female locating sleeve 24 as a result of a mechanical pressure exerted by compressing spring 8.

However, it may prove necessary to limit the angular amplitude of pivoting of coupling sleeve 27 permitted by means 29 and 30 in order to ensure in all cases the simultaneous penetration of all the locating sleeves of the multichannel connector.

To this end the invention provides for the insertion of each locating sleeve 24 equipped with its coupling sleeve 27 into an individual sheath 40, whose internal diameter is chosen to define a maximum value of the rotation angle of typically ±1°. Moreover, this sheath has at its intake 41 a guidance cone 42, whose external and internal diameters are defined so as to compensate alignment differences of the locating sleeves, particularly for multichannel connectors.

Finally it is possible to see in FIGS. 1 and 2 a hemispherical joint 50 on whose spherical part bears the coupling sleeve 27 during its possible rotation operation about the pivoting point 51 of the ball joint.

Joint 50 is provided with a central groove in which passes the locating sleeve 24. The spherical face of joint 50 has a radius of curvature R, whose centre is the pivoting point 51 of the ball joint. The solid face of joint 50 bears on two shoulders 52 and 53 carried by end fitting (B). During the connection of (A) and (B) it is possible in this way to prevent reciprocal stressing of the locating and coupling sleeves, thereby facilitating connection and self-alignment of the fibres.

The construction of the male-female assembly according to the invention has made it possible to verify the possibility of connecting two optical fibres with an attenuation equal to or below 0.5 dB at the connection level, in the case of the simultaneous connection of six optical channels. The coupling sleeve described hereinbefore is constituted by a tube made from an elastic material and equipped with a longitudinal slot. However, preferably the sleeve as described in French Patent Application No. 80 06 613 is used and said sleeve is constituted by a tube-like cylindrical part having a plurality of longitudinal clamping jaws regularly distributed over the tube periphery. Further details thereon can be gathered from the aforementioned French Patent Application.

What is claimed is:

1. An end fitting for an optical fibre connector carrying at least one substantially cylindrical locating sleeve in which is fixed an optical fibre, said locating sleeve having at its front end a contact face at which the fibre issues and in the vicinity of its back end means for positioning the locating sleeve in the end fitting, as well as means for orienting said locating sleeve, wherein the means for orienting the locating sleeve includes ball joint means positioned between the positioning means of the locating sleeve and the back end of the end fitting for permitting pivotal movement of the locating sleeve within said end fitting and wherein the positioning means includes a disk having a central groove whose outer and inner base surfaces respectively cooperate with shoulders defined by the end fitting of the connector and the locating sleeve located therein, said disk defining a transverse clearance with the end fitting while being fixed to prevent translational movement thereof.

2. An end fitting according to claim 1, wherein the ball joint means includes a groove cooperating with an O-ring located therein and bearing on the corresponding inner recess of the end fitting.

3. An end fitting according to claim 2 wherein the O-ring is elastic and seals the end fitting.

4. An end fitting according to claim 1, further comprising a coupling sleeve positioned on the locating sleeve.

5. An end fitting according to claim 4, wherein the coupling sleeve is held in the end fitting by joined parts connected thereto.

6. An end fitting according to claim 1, 4 or 5, further comprising a hemispherical joint means defining a central groove and a planar face cooperating with shoulders defined by the end fitting and whose spherical face is in contact with the coupling sleeve permitting easy rotation of the locating sleeve and the coupling sleeve without stressing the coupling sleeve.

7. An optical fibre connector comprising two end fittings which, when joined, ensure the connection of at least one optical channel, at least one of the end fittings comprising at least one substantially cylindrical locating sleeve in which is fixed an optical fibre, said locating sleeve having at its front end a contact face at which the fibre issues and in the vicinity of its back end means for positioning the locating sleeve in the end fitting, as well as means for orienting said locating sleeve, wherein the means for orienting the locating sleeve includes ball joint means positioned between the positioning means of the locating sleeve and the back end of the end fitting for permitting pivotal movement of the locating sleeve within said end fitting and wherein the positioning means includes a disk having a central groove whose outer and inner base surfaces respectively cooperate with shoulders defined by the end fitting of the connector and the locating sleeve located therein, said disk defining a transverse clearance with the end fitting while being fixed to prevent translational movement thereof.

8. A connector according to claim 7, wherein the locating sleeves of each end fitting are connected in pairs by means of a coupling sleeve.

9. A connector according to claim 8, wherein the coupling sleeve comprises a plurality of longitudinal clamping jaws regularly distributed about the common axis of the connected fibres.

10. A connector according to claim 7, wherein the locating sleeves of the two end fittings include angular positioning means about the longitudinal axis thereof.

11. A connector according to claim 10, wherein the angular positioning means include a lug carried by a locating sleeve cooperating with a longitudinal groove in the end fitting.

12. A connector according to claim 7, wherein at least one of the end fittings has longitudinal positioning means for the locating sleeve.

13. A connector according to claim 12, wherein the longitudinal positioning means comprise elastic means which, after the connection of two end fittings, permit the application of a bearing force between the two respective contacting faces of the locating sleeves of the two end fittings.

14. A connector according to claim 7, wherein one of the end fittings comprises a locating sleeve which can move longitudinally as a result of a spring bearing on the one hand on a flange integral with the sleeve and on the other hand on a ring integral with the end fitting.

15. A connector according to claim 14, wherein the end fitting has an opening through which passes the said locating sleeve, the opening having a diameter which is slightly larger than that of the locating sleeve, thus permitting a certain lateral clearance of the sleeve during the coupling operation.

* * * * *